Figure 1:
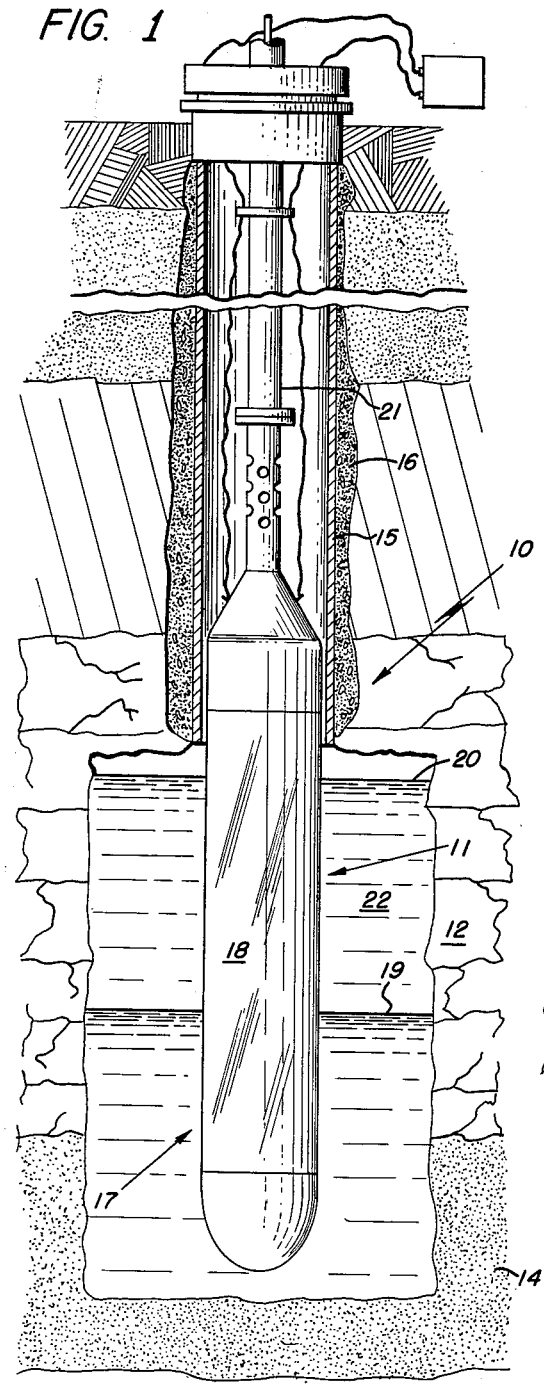

Sept. 24, 1963

D. B. HAAGENSEN 3,104,711

SUB-SURFACE HEATING SYSTEM

Filed March 30, 1961

INVENTOR
DUANE B. HAAGENSEN
BY Robert F. O'Connell
ATTORNEY 3,104,711
SUB-SURFACE HEATING SYSTEM
Duane B. Haagensen, South Lincoln, Mass., assignor to Raytheon Company, Waltham, Mass., a corporation of Delaware
Filed Mar. 30, 1961, Ser. No. 99,442
3 Claims. (Cl. 166—60)

This invention relates generally to the heating of sub-surface formations and more particularly to improvements in the heating of sub-surface formations with high frequency energy.

In my previously filed copending application "Oil Well Microwave Tools" Serial No. 28,340, filed May 11, 1960, there is described a method of utilizing high frequency energy, especially in the microwave region of the frequency spectrum, to enhance the recovery of petroleum products in sub-surface reservoirs. The invention described therein comprises a system for applying said energy to the sub-surface formation from suitable energy generating sources, such as magnetrons, positioned within the well bore at the general viicinity of the oil producing reservoir. The generating equipment described therein is housed in a substantially tubular plastic capsule secured to the lower end of the oil well producing string. The output microwave power from the magnetrons is radiated from specially designed radiating cavities which provide an efficient transmission of the energy through the plastic material of the capsule into the oil-bearing formation.

In the utilization of said tools, a problem arises if the tool becomes surrounded by water which may be present in the well bore. In some sub-surface wells the presence of water in regions adjacent the petroleum bearing formation causes the well bore to gradually become filled with water by well known "Scrubbing" action.

As the oil is pumped to the surface, water which enters the well bore at the bottom rises gradually until it fills a large portion of the bottom section of the bore. Since the capsule is inserted at the bottom of the well bore, this scrubbing action causes the radiating portions of the capsule to become immersed in water.

Under such conditions the high frequency energy which is being radiated from the capsule to the oil-bearing formation must pass through the water that is present between the capsule and the formation. The presence of the water causes a loss in the transmitted microwave energy because a sizeable portion of the radiated energy is absorbed by the water before it reaches the oil-bearing formation and, hence, results in a reduction in the heating action of the oil within the formation. In addition, since the dielectric constant of water is substantially different from the dielectric constant of oil, an impedance mismatch will occur for tools designed to radiate into oil.

This invention describes a means for improving the transmission of said energy by introducing a low loss material into the well bore between the radiating energy source and the oil-bearing formation. The electrical characteristics of the material are chosen so as to provide substantially no loss in the transmission of the high frequency energy. The dielectric constant of the material is chosen as to provide a relatively good impedance match between the radiating source and the oil-bearing formation. The specific gravity of the material is chosen to be greater than that of water so that when introduced in the well it displaces the water at the bottom of the well bore. The material should also have a low solubility in water and may generally be chosen to have non-corrosive and non-oxidizing properties.

The low loss materials in a specific embodiment of the invention may be of a liquid form, said liquid being inserted into the well bore in a manner so as to substantially fill the well bore in the vicinity of the oil-bearing formation and, thus, to surround the capsule in which the radiating energy source is located. In one specific embodiment, for example, carbon tetrachloride is inserted into the well bore from a suitable surface supply through tubing placed in the bore at the well head. Because the specific gravity of the carbon tetrachloride is greater than that of water, a sufficient amount of said material displaces the water which may be present normally at the bottom of the bore and, thereby, prevents the water from rising to a level such as to cause immersion of the capsule. The capsule generally and the radiating section of the capsule particularly, therefore, become substantially surrounded by carbon tetrachloride. Because of the particular high frequency electrical transmission properties of the carbon tetrachloride, a low loss transmission path is provided between the radiating source and the formation so that the most efficient transfer of high frequency energy is accomplished.

Figure 2:
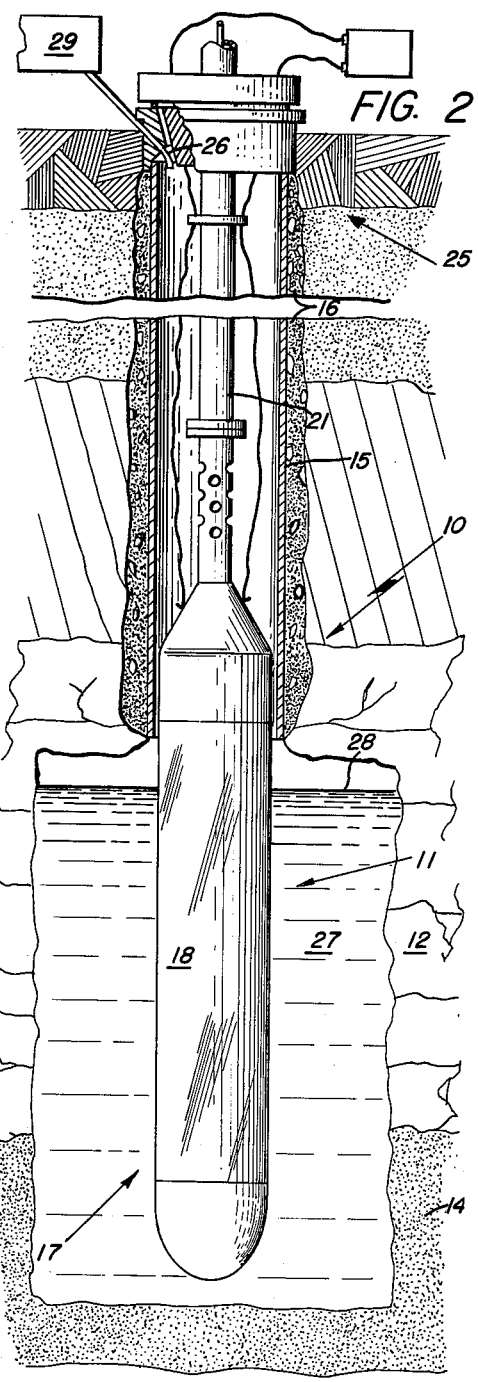

The invention may be more easily described with the aid of the accompanying drawing in which:

FIG. 1 illustrates the conditions in a well bore in which a radiating capsule has been placed prior to the introduction of the low loss material in accordance with the invention; and FIG. 2 shows the well bore of FIG. 1 after a low loss material has been inserted into the bore to provide improved energy transmission.

In FIG. 1 a portion of a well bore 10 has inserted therein a radiation capsule 11 which may be, for example, of the type described in my above-mentioned, previously filed application. As described in said application, the capsule has a plastic portion 18 having placed therein means, such as magnetrons, for radiating high frequency energy through the plastic walls of the capsule. For clarity, the specific radiating means are not shown in the figures.

The capsule is positioned within the well bore at a region substantially opposite a petroleum bearing formation 12 and is suspended from the end of the production string 21 of the well bore. As shown in the figure, the oil producing zone of the formation, designated herein as 12, extends substantially along the major portion of the length of capsule 11. As is conventional in well bore formations, the well casing 15 is embedded in cement 16 to prevent water from formations above the oil producing zone from entering the well bore. Adjacent to and below oil producing zone formation 12, there is shown a formation 14 having a substantially high content of water which enters the well bore at the bottom of the open hole structure 17. As the oil is pumped upward from the oil producing zone, the initial water level, shown by solid line 19, rises gradually until it reaches a level as shown for example, by the line 20. Thus, the water ultimately surrounds the plastic radiating portion of capsule 11. When this occurs the water 22 surrounding the capsule provides a relatively high loss path for the radiating energy so that a substantial portion of the energy is dissipated in the water before the energy reaches the formation. In addition an impedance, mismatch may, thereby, occur between the radiating source and the formation so that some energy may be undesirably reflected back to the source. Such conditions reduce the efficiency of the overall heating system.

In order to counteract these conditions, the means shown in FIG. 2 are utilized in accordance with the invention. In that figure structures corresponding to those shown in FIG. 1 bear like reference numerals. At the well head 25 a tubing 26 is inserted to provide means for introducing a low loss material into the well bore. In a specific embodiment, as shown herein, a source 29 for supplying a material such as carbon tetrachloride is shown connected to tubing 26. The carbon tetrachloride inserted at the well head is gravity fed to the bottom of the well bore and substantially fills the bottom portion of the bore as indicated by reference numeral 27. A sufficient amount of carbon tetrachloride is used to fill the bore to a level approximately opposite to the upper portion of the radiating section of capsule 11 as shown by solid line 28. Because the specific gravity of the carbon tetrachloride is greater than that of water (specific gravity equal to approximately 1.54), it substantially displaces any water present at the bottom portion of the well bore. Any water which subsequently enters from region 14 rises to a region above the carbon tetrachloride level 28 and is mixed with the oil-water emulsion which is being pumped from the oil producing pay zone 12.

The efficiency of the transmission path provided by the carbon tetrachloride may be indicated by considering the half power penetration characteristics of the material with reference to the applied high frequency energy. Half power penetration is defined as the distance within a material at which the power applied to the material from a high frequency source is reduced to one half of its initial value. For example, at 3000 megacycles, the half power penetration point of carbon tetrachloride is approximately 14 meters. This characteristic assures that very little power is dissipated in the carbon tetrachloride by the transmission of the high frequency energy through the short distance between the radiating capsule and the formation, said distance being generally substantially less than a meter. This characteristic of carbon tetrachloride compares with the half power penetration characteristic of water which is approximately 1 cm. The half power penetration of crude oil (number 18 API viscosity) is approximately one meter and that of a typical core formation is approximately 20 centimeters. Thus, it can be seen that the portion of the path containing carbon tetrachloride is a substantially low loss portion compared either to that of water or that of the oil and core formation. Hence, the greatest energy dissipation is within the oil and core formation as described. Such half power penetration characteristics provide considerably better transmission than would be obtained for the conditions shown in FIG. 1 wherein the capsule is immersed in water. Thus, a low loss path is therefore provided between the radiating source within the capsule 11 and the petroleum-bearing formation 12.

The carbon tetrachloride also provides a suitable impedance match between the radiating source and the petroleum-bearing material. At the frequencies involved carbon tetrachloride has a dielectric constant of approximately 2.17. This value compares with a range of dielectric constants from approximately 5 to 10 for conventional oil-bearing formations. Moreover, carbon tetrachloride has a very low solubility in water and is neither a corrosive nor an oxidizing agent.

Other materials having similar characteristics at the particular desired frequencies involved may also be used. In some applications it may be desirable or advantageous to reduce the water volume surrounding the capsule by inserting solid materials or pellets around the capsule. Such solid materials also reduce the energy loss in the transmission path and may be selected to provide a good impedance match between the source and the formation.

Moreover, the term "well bore" as used herein is not to be construed as necessarily limited to a petroleum well bore inasmuch as the invention may be useful in enhancing the recovery of other types of products from a sub-surface formation. Moreover, the invention is not limited to use only within the period during which the well is actually producing. Operation of the invention in a non-production well or to non-pumping time periods of a producing well also falls within the contemplated scope of the invention. For example, the invention may find use in fluid-injection wells, as in conventional "five-spot" water-injection configurations. In the latter application a non-producing well located in a field at the approximate center of a four well diamond matrix may be utilized as a source of water which is injected into the center of the field to displace the oil in the central region and, thus, cause the oil to migrate to the producing wells for recovery. The invention can be utilized to enhance the water-injection processes by providing an efficient heating of the injected water to improve the efficiency of the oil recovery.

Hence, the invention is not to be construed to be limited to specific embodiments shown and described herein except as defined by the appended claims.

What is claimed is:

1. Means for heating a sub-surface formation comprising means for generating high frequency electromagnetic energy, means for radiating said energy from a well bore into said sub-surface formation, a liquid material of substantially low water solubility and substantially inert in the presence of oil located in said well bore between said radiating means and said sub-surface formation for providing a substantially lower loss transmission path from said radiating means to said sub-surface formation than the loss in said formation, said material having a specific gravity greater than that of water and having a dielectric constant of the same order of magnitude as that of said sub-surface formation.

2. Means for heating a sub-surface formation comprising means for generating high frequency electromagnetic energy, means for radiating said energy from a well bore into said sub-surface formation, a liquid comprising carbon tetrachloride in said well bore surrounding said radiating means thereby providing a lower loss transmission path between said radiating means and said sub-surface formation than the loss in said formation.

3. Means for heating a sub-surface formation comprising a capsule positioned within a well bore at a region substantially opposite a sub-surface formation, means for generating high frequency electromagnetic energy located within said capsule, means for radiating said high frequency energy through said capsule into said sub-surface formation, a liquid comprising carbon tetrachloride in said well bore surrounding said radiating portion of said capsule thereby providing a lower loss transmission path between said radiating portion of said capsule and said sub-surface formation than the loss in said formation.

References Cited in the file of this patent

UNITED STATES PATENTS

| | | |
|---|---|---|
| 2,670,801 | Sherborne | Mar. 2, 1954 |
| 2,685,930 | Albaugh | Aug. 10 1954 |
| 2,757,738 | Ritchey | Aug. 7, 1956 |

OTHER REFERENCES

Hartshorn: Radio Frequency Heating, pub. 1949 by George Allen and Unwin Ltd., pages 170, 171.